Nov. 5, 1946.   H. O. NAUMANN   2,410,456
APPARATUS FOR THE MANUFACTURE OF SYNTHETIC YARN
Original Filed July 14, 1942   10 Sheets-Sheet 5

Inventor
Herbert O. Naumann
By Rudolph S. Bley
Attorney

Inventor
Herbert O. Naumann
By Rudolph S. Bley
Attorney

Nov. 5, 1946.  H. O. NAUMANN  2,410,456
APPARATUS FOR THE MANUFACTURE OF SYNTHETIC YARN
Original Filed July 14, 1942  10 Sheets-Sheet 7

Inventor
Herbert O. Naumann
By Rudolph S. Bleay
Attorney

Patented Nov. 5, 1946

2,410,456

UNITED STATES PATENT OFFICE 2,410,456

APPARATUS FOR THE MANUFACTURE OF SYNTHETIC YARN

Herbert O. Naumann, Englewood, N. J., assignor to North American Rayon Corporation, New York, N. Y., a corporation of Delaware Original application July 14, 1942, Serial No. 450,934. Divided and this application June 3, 1943, Serial No. 489,554

3 Claims. (Cl. 18—8)

1

This invention relates to the manufacture of threads of synthetic origin, and is more particularly concerned with a process and apparatus for the continuous manufacture of wet spun threads.

Continuous spinning as the name implies, comprises the introduction of a hydrated colloid into a spin bath to form a thread, the after-treatment of successive portions of the freshly formed thread while it is moving from the spin bath to a point of collection and the collection of the completely finished thread into a commercially salable package. The very nature of continuous operation renders the handling of the thread, for instance from one treating unit to another or during the exchange of an empty bobbin for a full one, extremely difficult. Deft and accurate handling of the thread during these periods is of extreme importance and demands the exercise of unusual precautions to avoid loss of time and waste of materials.

One of the objects of this invention is to reduce to a minimum the time required for the transfer of the thread from one element of the machine to another and hence avoid any more loss of production than is absolutely necessary for the transfer.

Another object is to properly support the thread at all times, i. e., during the threading-up of the machine or during the exchange of a full bobbin for an empty one and hence facilitate the handling of the thread during such periods so as to avoid undue waste.

The above and other objects may be attained by employing this invention which embodies among its features forming a thread, leading the formed thread through various stages of treatment, temporarily collecting the thread into a waste bundle between its point of origin and its point of collection, meanwhile performing an intra-related thread-handling operation such as transferring the thread from one unit to another or exchanging a full thread package for an empty one, separating the waste bundle from the oncoming thread and directing the oncoming thread to successive elements of the machine for further manipulation.

Another feature of the invention is a collecting device movable from station to station on the machine upon which the oncoming thread may be wound preparatory to or while it is being transferred from one element of the machine to another and means to arrest the collecting device and hold it in proper relation to the elements of a station.

2

Other advantages of this invention will be apparent upon consideration of the following detailed description thereof in conjunction with the annexed drawings wherein.

Referring now in detail to Figures 1 to 4, inclusive, it will be seen that the spinning machine illustrated includes a number of spinning units, each consisting basically of a spinneret 10 and a pair of thread-storage, thread-advancing devices 11 and 12. On devices 11 and 12, the freshly formed thread is subjected to all required aftertreatments, whereupon it is concurrently twisted and collected on twisting spindle 13 in finished form. For convenience in illustration, all of the component units of a continuous spinning machine constructed according to the present invention have not been illustrated. It is contemplated, however, that a single machine include some 50 to 70 spinning units arranged in alignment as illustrated. While it will be increasingly evident upon consideration of the following description that this invention is adaptable to any type of wet spinning operation involving the preparation of a thread in the form of a hydrated colloid, the apparatus will be specifically discussed in conjunction with the manufacture of viscose rayon.

At spaced points along the length of the rear wall of spin bath container 14, godets 31 are provided, each of these consisting of a driven wheel 32 and a freely rotatable one 33. The thread issuing from each spinneret 10 is first led around the respective godet 31 and then to the thread-storage, thread-advancing unit 11.

As can be seen in the drawings, each unit 11 is comprised of two generally horizontally extending rollers 45 and 46.

Although rollers 45 and 46 both extend generally horizontally, it is the usual practice to dispose the axis of roller 46 in a truly horizontal direction while that of roller 45 is slightly inclined with respect to the horizontal so that thread wound around the two rollers will necessarily progress in the direction of convergence, i. e., toward the unsupported end of the unit.

Figure 2:
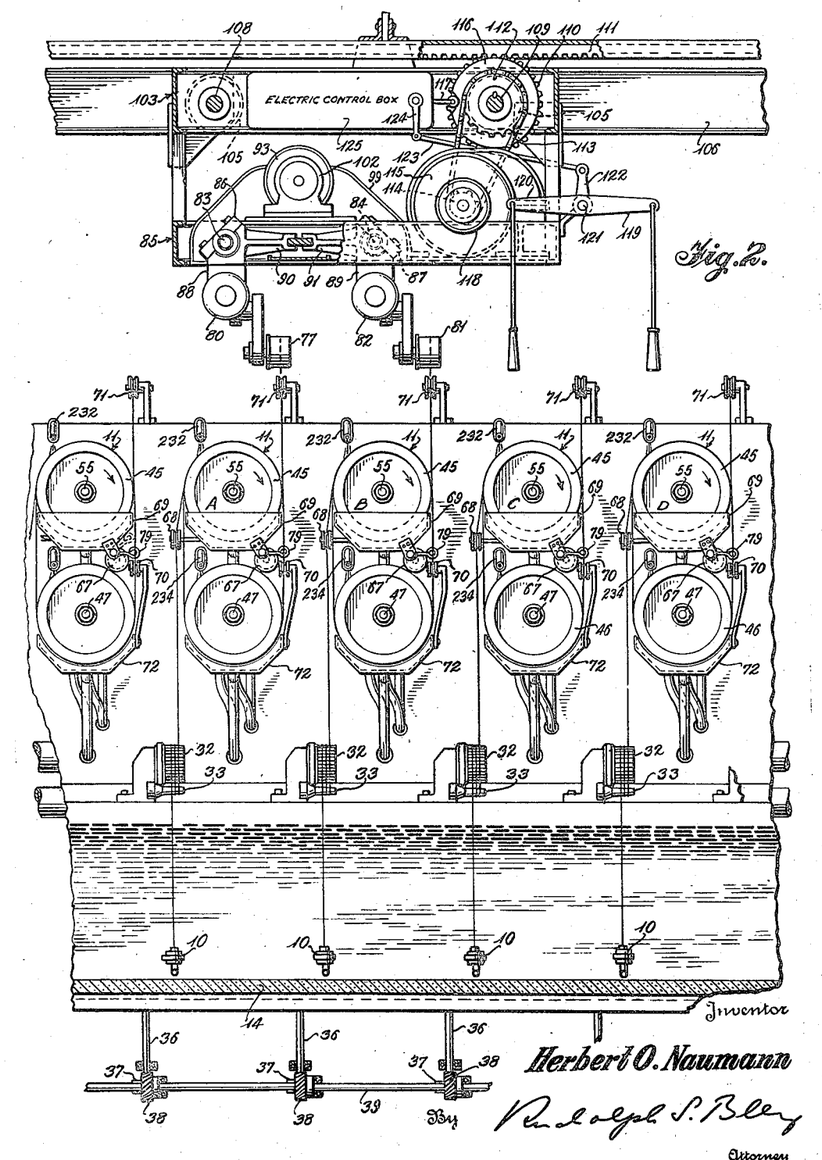
Figure 2 is a view in side elevation illustrating a portion of the right or spinning side of the machine of Figure 1.

As illustrated in Figure 2, rollers 45 and 46 which constitute unit 11 are arranged in such a way that their axes lie in the same vertical plane but are convergent in the direction of the unsupported end of the unit. This is convenient from the standpoint of space economy, but is not essential. It is evident that the axial feeding theory will likewise obtain in any arrangement involving at least two rollers, the axes of which lie in intersecting planes.

Figure 1:
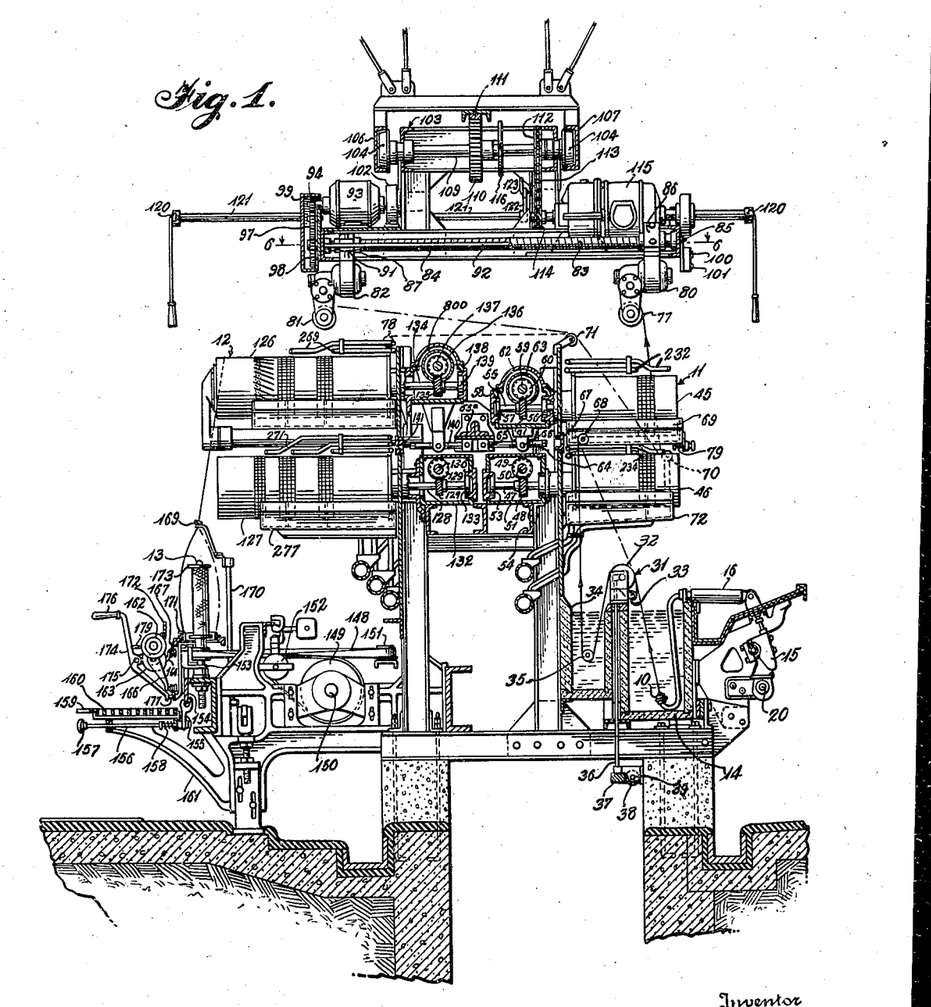
Figure 1 is an end view, partially in section, of a preferred type of continuous spinning machine constructed according to this invention.

The thread leaving the godet 31 is first led on to the upper cylinder 45 of unit 11 over a guide roller 68, located adjacent the supported end of cylinder 45, said guide roller being supported on a bracket extending from collection trough 69 which underlies roller 45. It is led off of the opposite side of upper roller 45 of unit 11, under a guide roller 70 adjacent the free end of the unit, over a guide roller 71 and from thence over a guide roller 78 to a thread-storage, thread-advancing unit 12 which is mounted on the opposite side of the machine. Guide roller 70 is supported on a bracket extending upwardly from collection trough 72 underlying roller 46, while guide roller 71 is supported on a bracket attached to a portion of the machine frame. The path of the thread to and from unit 11 is shown in Figure 1, the spaced coils wound around the two rollers being omitted for convenience in illustration, see Patent No. 2,194,470 to Hartmann et al.

It will be understood of course that treating liquids are supplied to the yarn on the rollers 45 and 46 by supply pipes 232 and 234 respectively.

In the operation of the machine, it is evident that the rollers 45 and 46 must be driven at the same peripheral speed. This is best done by driving shafts 50 and 59 (Fig. 4) in synchronism from a common power source or by driving one shaft from the other. Shafts 50 and 59 are provided with pinions 73 and 74, respectively, of like size, both pinions meshing with a driving gear 75 driven from a gear 76 on main power shaft 25. While it is important that the peripheral speeds of rollers 45 and 46 be identical, it is evident that their takeup speed may be in excess of the delivery speed of the adjacent godet 31 so that stretching may occur between each unit 11 and its associated godet 31. Arrows in Figures 1, 2 and 4 serve to illustrate the direction of rotation of the rollers of unit 11.

It will be recognized that the axial movement of the coils of thread from the supported toward the unsupported end of thread-storage, thread-advancing device 11 will occur only after that device has been threaded up. To do this it is, of course, first necessary to initiate rotation of shafts 50 and 59, which, through the intermediate gearing, cause rotation of shafts 47 and 55 and the rollers 46 and 45, carried thereby. This is done by starting motor 17, which action likewise causes operation of the pumps 15 as well as godets 31. At this stage, the spinning solution is extruded from each spinneret 10. The operator then grips the material issuing from the spinneret, pulls it up from the bath and winds the resulting thread several times around godet wheels 32 and 33, making enough convolutions to prevent slipping. The thread is then led from the godet, and wound around rollers 45 and 46 in the form of a closed coil consisting of a number of contiguous or superimposed convolutions. This coil may be wound near the supported end of the unit 11 in which case it will move as a body to the unsupported end of the unit and the successively spun thread will be wound on in a position determined by the angular disposition of the roller 45. As the coil begins to move toward the unsupported end of unit 11, the operator drops the connecting thread into freely rotatable guide roller 68 so that each newly formed coil will be located directly adjacent the supported end of the device, the thread is broken between the unsupported end of the unit 11, the thread is broken between the coil and the spaced convolutions on the roller and the coil is removed and discarded. The resulting free end of thread is then led under roller 70 and over roller 71 and onto a rotating temporary collecting device 77. This device is moved bodily from the position shown in Figure 1 to a position overlying a guide roller 78 bearing a position with respect to thread-storage, thread-advancing unit 12 similar to the position of guide 71 with respect to unit 11. Unit 12 may then be threaded up in the manner just described.

Upon consideration of Figures 1 and 2, it will be seen that some difficulty may be encountered in winding a closed coil around rollers 45 and 46 near their supported ends because of bath trough 72. It is entirely possible to mount bath trough 72, however, in such a way that it may be tilted to a position sufficiently spaced from the roller so as to obviate interference with threading up as previously described; in this connection see Figures 14 through 16 to be hereinafter more fully described. The tilting of trough 72, while of convenience in some installations, is in no sense essential. In Figure 1 it can be seen that the free end of roller 46 extends beyond the end of trough 72. When this arrangement is used, any of the thread-storage, thread-advancing units may be threaded up by winding the closed coil adjacent the unsupported end thereof and manually leading the connecting thread over freely rotatable guide roller 68. If this is done, a stop guide 79 must be used to prevent the coil from running off the end of the unit while it is threading itself. In Figure 2 it can be seen that guide 79 is in the form of a porcelain loop pivotally attached to a bracket affixed to trough 69. In the full line position of Figure 2, guide 79 functions to prevent the thread loop from moving axially off the end of the unit. When not in use, guide 79 may be manually swung to the broken line position of Figure 2 where it will not longer contact the thread connecting tangentially rollers 45 and 46.

When the closed coil is wound adjacent the free end of unit 11, around cylinders 45 and 46, the threading action of the unit is brought about by the winding of additional coils of newly spun thread thereon and by the pulling of a few of the convolutions off of the closed coil in the direction of the supported end of the unit, the latter occurring when the takeup speed of the thread-storage, thread-advancing device is in excess of the speed of delivery of the thread thereto. As threading up commences, the spacing between coils will be relatively great, but will gradually lessen until the spacing predetermined by the angular adjustment of roller 45 has been reached. At this time, the closed coil can be broken off and discarded and the thread led to a new stage as, for example, temporary collecting device 77 in the case of a unit 11.

While the foregoing description of threading up has been confined to the threading up of unit 11, it is evident that exactly the same procedure may be followed in the case of unit 12. Thus, the trough underlying the lower roller of each unit 12 may be moved away from the roller to permit threading up by winding a closed coil adjacent the supported end of the unit or a guide such as guide 79 may be used to permit winding the closed coil adjacent the unsupported end of the unit. Neither of these is illustrated in Figure 1. It is contemplated, however, that a guide such as guide 79 be associated with the trough of the upper roller of unit 12 in the same manner that guide 79 is associated with trough 69.

After the thread-storage, thread-advancing unit 11 has been threaded up, it has been stated that the thread is carried from a point adjacent the free end of that unit to a point adjacent the supported end of thread-storage, thread-advancing unit 12 so that the latter may be threaded up in the manner previously described. This movement is effected by leading the free end of thread from thread-storage, thread-advancing unit 11 to a small rotating cylinder 77 constituting a temporary collecting device. Collecting device 77 is supported by and driven through suitable gearing from a motor 80. Thus, the free end of thread is wound around rotating temporary collecting device 77, and motor 80, with the temporary collecting device, is bodily moved from right to left as viewed in Figure 1 so that temporary collecting device 77 is positioned adjacent the supported end of thread-storage, thread-advancing unit 12. The peripheral speed of the small cylinder 77 constituting the temporary collecting device is so correlated with the speed of bodily movement of the temporary collecting device across the machine from right to left in Figure 1 that the cumulative take-up effective at the free end of unit 11 is very slight in excess of the delivery speed of that unit. In this way, the occurrence of slack is avoided while the thread is not subjected to excessive tension.

Figure 5:
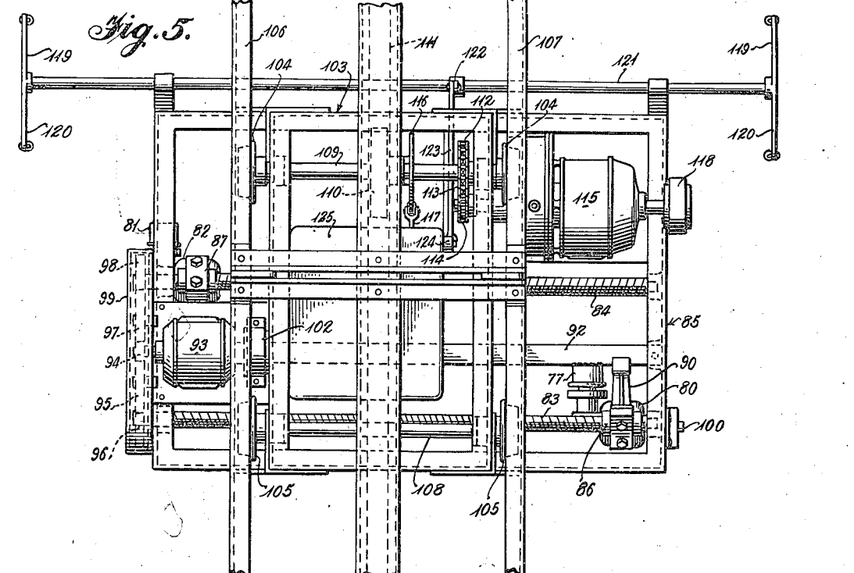
Figure 5 is a top plan view of the entire mechanism for transporting thread from one to the other side of the spinning machine of Figure 1 during threading up thereof, the underlying thread-storage, thread-advancing units being omitted for convenience in illustration.

So that a plurality of adjacent pairs of thread-storage, thread-advancing units may be threaded up with maximum convenience, another small cylindrical temporary collecting device 81 is disposed in horizontally offset position with respect to device 77 a distance equal to the space between the axes of adjacent units. Device 81 is supported and driven from a motor 82 of structure and functional characteristics similar to motor 80. Upon reference to Figures 1 and 5, it can be seen that collecting devices 77 and 81 are normally disposed on opposite sides of the machine. Thus, when collecting device 77 is overlying a thread-storage, thread-advancing device 11, temporary collecting device 81 is in a similar position over an adjacent thread-storage, thread-advancing device 12.

Figure 3:
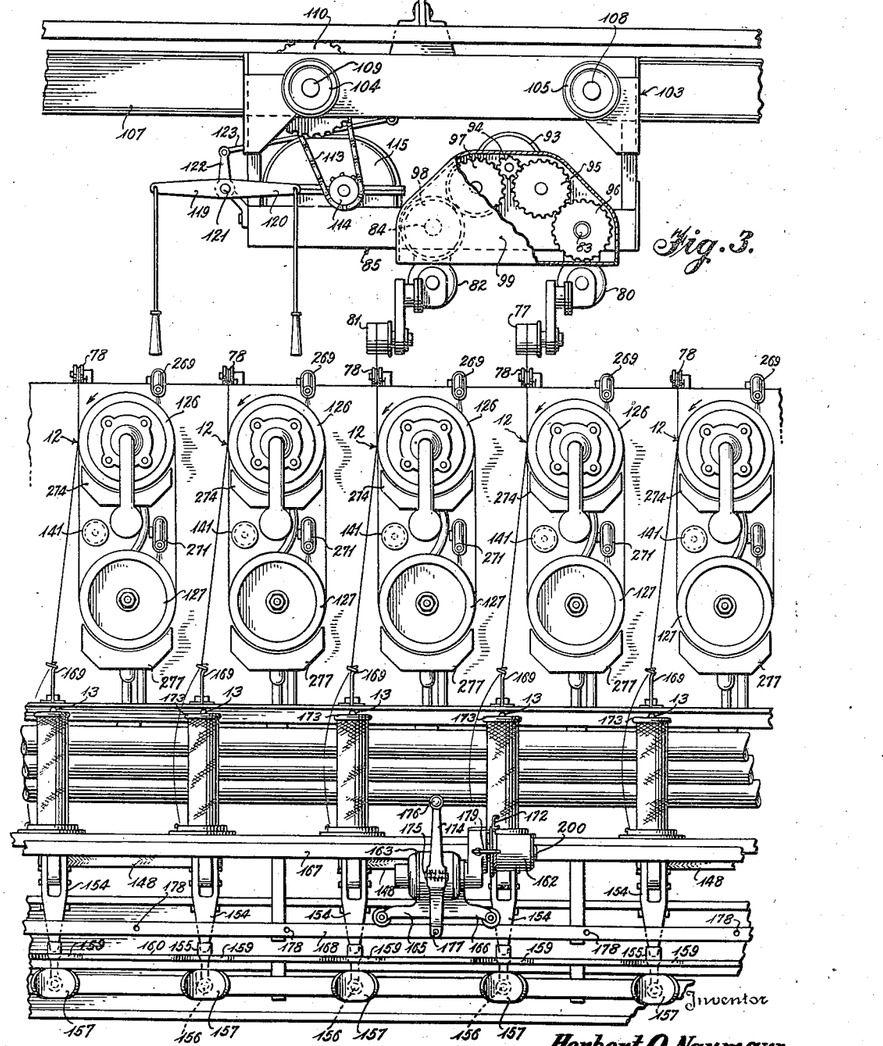
Figure 3 is a view in side elevation illustrating a portion of the left or finishing side of the machine of Figure 1.
Figure 4:
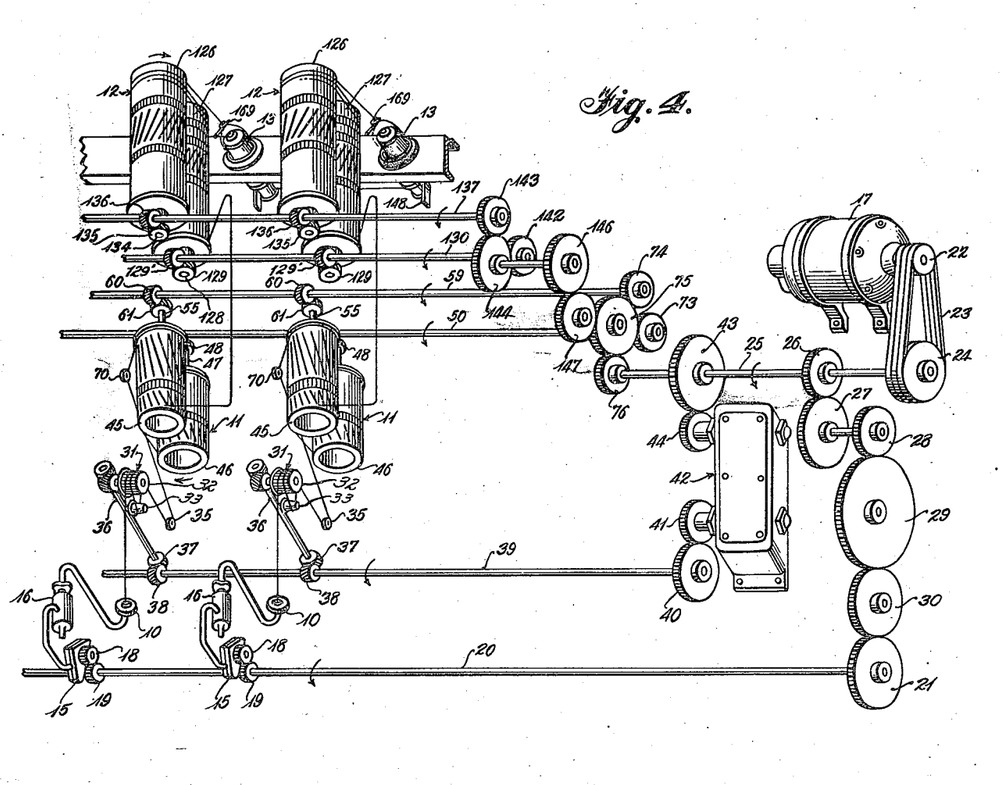
Figure 4 is a schematic perspective view of a typical driving arrangement for the spinning machine shown in Figures 1 to 3 inclusive.

Upon reference now to Figures 2 and 3, the manner of threading up a machine by the use of collecting devices 77 and 81 may be ascertained. In Figure 2, temporary collecting device 77 is disposed above a thread-storage, thread-advancing unit 11 designated by the reference letter A. At the same time, temporary collecting device 81 is over a thread-storage, thread-advancing device 12 in aligned position behind the unit 11 marked B on Figure 2. When unit A has been threaded up, the operator leads the free end of thread around temporary collecting device 77, which is driven by motor 80 continuously throughout the threading up period. Thereafter, motor 80 is bodily moved to the opposite side of the machine, carrying with it the thread issuing from unit A which is being concurrently wound on device 77. At the same time, temporary collecting device 81 is moved toward the operator on the spin bath side of the machine to a position over unit B similar to the position previously occupied by temporary collecting device 77 over unit A. Thus, one operator on the spin bath side of the machine may be threading up a unit B while another operator on the finishing side may be threading a unit 12 in alignment with the unit 11 marked A. In this way, both of the operators are continuously occupied. It will, of course, be understood that when the temporary collecting device completes its bodily movement across the machine, it will have wound thereon a very small amount of thread. This is treated as waste and the thread is broken by the operator directly adjacent the collecting device and led around the thread-storage, thread-advancing unit in question in a manner previously described. After the unit B of Figure 2 has been threaded, the position of temporary collecting devices 77 and 81 is again reversed. The operator then breaks the thread adjacent temporary collecting device 81 and begins threading the unit 12 which is in alignment with unit B of Figure 2. Thread-storage, thread-advancing unit 77, in its return movement from the finishing side to the spinning side of the machine, carries no thread over to a point above unit A since this unit has already been threaded. Accordingly, immediately after breakage of the thread adjacent temporary collecting device 81, as the operator starts to thread the unit 12 behind B of Figure 2, the entire assembly supporting temporary collecting devices 77 and 81 is moved to the right of Figure 2 a distance equal to twice the distance between the centers of adjacent units. This brings collecting device 77 over unit 11 marked C and device 81 over a unit 12 behind and in alignment with unit D. When this stage has been reached, the previously described operation is repeated and so on until the entire machine is threaded up.

Figure 6:
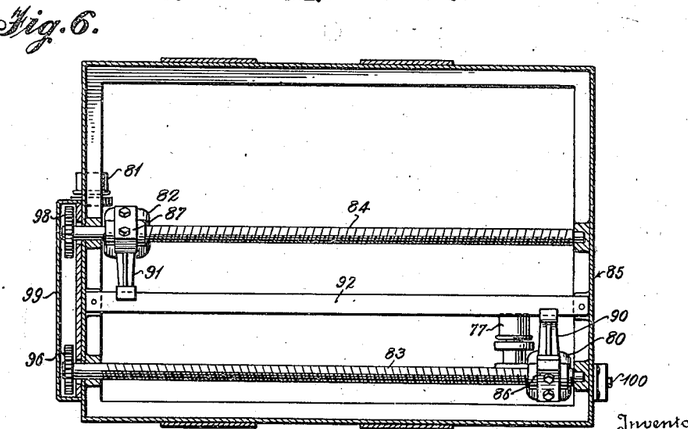
Figure 6 is a top plan view partially in section, taken along the line 6—6 of Figure 1 and serving to further illustrate the mechanism shown in Figure 5.

It has been stated that motors 80 and 82 and the temporary collecting devices supported and driven thereby are bodily moved across the width of the machine. This movement is effected by the concurrent rotation of oppositely threaded screws 83 and 84 (Figs. 5 and 6) supported in rectangular frame 85 and in respective driving engagement with interiorly threaded members 86 and 87 which surround the threaded shafts 83 and 84 and have depending shanks 88 and 89 which serve to support motors 80 and 82, respectively. To prevent pivotal movement of motors 80 and 82 and the assemblies carried thereby about threaded shafts 83 and 84 as axes, brought about by the rotation of those shafts, members 86 and 87 are provided with arms 90 and 91 extending in mutually convergent relation at right angles to respective shanks 88 and 89. The free ends of arms 90 and 91 are slotted and receive therein a guide rail 92 which extends for the full width of the machine and is suitably supported in frame 85.

Since shafts 83 and 84 are oppositely threaded, it will be apparent that, if both are driven, members 86 and 87 will move across frame 85 in opposite directions carrying with them the respective motors 80 and 82 and temporary collecting devices 77 and 81.

The intermittent rotation of shafts 83 and 84 is effected through a reversible motor 93, the rotor shaft of which is provided with a pinion 94. Pinion 94 is operatively connected to threaded shaft 83 through an idler gear 95 which meshes with a gear 96 keyed to threaded shaft 83. A similar gearing arrangement including an idler 97 and a gear 98 keyed to shaft 84 serves to establish a driving connection between the latter and pinion 94. Conveniently, the gearing connecting the rotor of motor 93 and shafts 83 and 84 is enclosed in a dust-proof housing 99. It can now be seen that for any given direction of rotation of motor 93, members 86 and 87 will be driven in opposite directions. It is necessary, however, that the direction of bodily movement of collecting devices 77 and 81 be reversed each succeeding operation thereof. It is for this reason that motor 93 is of a reversible type. The exact construction of motor 93 forms no part of this invention, it being contemplated that any conventional reversible electric motor of suitable characteristics may be used. The motor is controlled through a circuit, not shown, from a pair of push buttons 100 and 101, (Fig. 1) each of which serves to drive the motor in one direction only. The stoppage of motor 93 is effected automatically by a pair of limit switches of any conventional construction disposed on opposite sides of bar 92 adjacent one of its ends, one switch being in the path of each of arms 90 and 91. Thus, for example, the rotation of motor 93 in one direction may be stopped when arm 90 reaches a predetermined position and the rotation in the other direction may be stopped when arm 91 reaches a similar predetermined position at the same end of frame 85. Since motor 93 will necessarily develop a certain amount of inertia in operation, it is highly desirable that the stoppage thereof be effected instantaneously to prevent possible damage of the equipment caused by either of members 86 or 87 exceeding the full amplitude of movement on screws 83 and 84. This is conveniently done by providing a magnetic brake 102, (Figs. 2 and 5) the control circuit for which is in circuit with the limit switches. This brake 102 is conveniently located on the end of the rotor shaft of motor 93 opposite pinion 94.

The bodily movement of temporary collecting devices 77 and 81 across the machine has now been described. It has been previously stated, however, that frame 85 is subject to bodily movement lengthwise of the machine. To this end frame 85 is supported from a car 103 having two pairs of flanged wheels 104 and 105 which ride in rails 106 and 107 supported above the machine in any convenient manner, see Figure 1. Wheels 105 may turn freely on axle 108 or may be attached thereto, the only requisite being that the wheel and axle assembly is freely rotatable. Wheels 104, however, are attached for free rotation at the ends of axle 109 and this axle, midway of its length, carries a keyed pinion 110 which is adapted to mesh with a rack 111 which extends for the full length of the machine at a position midway between rails 106 and 107. The manner of driving car 103 through rack and pinion 110—111 can now be described. To this end, axle 109 is provided with a keyed sprocket 112 connected by a chain 113 with a sprocket 114 on the rotor shaft of a motor 115. Thus, upon rotation of motor 115, sprocket 112 keyed to axle 109 will cause rotation of pinion 110, which meshing with rack 111, will pull the car 103 in a direction opposite to the direction of rotation of pinion 110. By energizing motor 115, the car 103 is moved lengthwise of the spinning machine. It is desirable, however, that the lengthwise movement be controlled so that temporary collecting devices 77 and 81 will be moved a distance exactly equal to twice the distance between the centers of adjacent units. This controlled movement is effected by so arranging the diameter of pinion 110 that 360° of movement thereof will move the car exactly the desired distance. After completion of this movement, motor 115 is automatically de-energized and the inertia thereof automatically overcome. This is effected through a timing disc 116 keyed to axle 109 adjacent pinion 110. This disc, as may be seen in Figure 2, is provided with a notch and serves to position a switch arm 117. Disc 116 is so disposed on axle 109 that the notch therein will be in registry with switch arm 117 upon completion of the desired movement lengthwise of the machine. Thus, arm 117 is normally held in a position to maintain the circuit to motor 115 closed. It serves to open the circuit to motor 115, however, when in registry with the notch of disc 116, and, at the same time, through relays to operate a magnetic brake 118 of a type similar to magnetic brake 102 previously described. Thus, motor 115 is automatically stopped. Initiation of rotation thereof is effected through switch arms 119 and 120 connected at the ends of a long shaft 121 which extends for the full width of the machine. Switch arms 119 and 120 are disposed in a position to be conveniently operated from either side of the machine by pull cords. A linkage 122, 123, 124 connects shaft 121 with switch box 125 in which the various controls for both motors 115 and 93 are located, as well as the relays for the operation of the magnetic brakes. It can be seen that if the operator pulls switch arm 119 and then immediately releases it, motor 115 will operate until the notch in disc 116 permits switch arm 117 to open the circuit. At this point it will automatically stop. On the other hand, if the operator should hold switch arm 119 during the time that the notch in disc 116 and switch arm 117 are in registry, motor 115 would continue to run. Thus, while the lengthwise travel of car 103, when initiated, is normally defined by the mechanism described, the starting and stopping thereof is also fully under the control of the operator. Switch arm 120 is used to drive motor 115 in the other direction and is normally employed for returning the entire threading up assembly to one end of the machine after threading up has been effected.

Having now described the manner in which the machine is threaded up including the apparatus for transferring the free ends from the units 11 to their respective units 12, the details of the latter units will be discussed.

Each unit 12 consists of two rollers 126 and 127, supported at one end only, and having their free ends extending generally horizontally. As in the case with lower roller 46 of unit 11, lower roller 127 is mounted on a shaft which extends axially of the roller and is in a truly horizontal position. This shaft, designated by numeral 128, is provided with a driving gear 129 keyed thereto which meshes with a gear 130, keyed to a main drive shaft 131. Drive shaft 131 is similar to drive shaft 50 and is provided with a plurality of gears 130, one for coaction with each gear 129 for each of lower rollers 127. Each meshing pair of gears 129, 130 is disposed in a housing 132 fixedly mounted on a portion of the main frame of the machine. Housing 132 is provided with a bearing 133 for supporting shaft 128.

Upper roller 126 of the thread-storage, thread-advancing unit 12 is likewise provided with an axially extending drive shaft, said shaft bearing the designation 134. Shaft 134 is provided with a gear 135 which meshes with a gear 136 mounted on main drive shaft 137. Shaft 137 is similar in structure and function to shaft 59 and it is provided along its length with a number of gears 136 corresponding to the number of rollers 126. The pairs of gears 135 and 136 are mounted in housing 138, each of which extends for a considerable distance into the interior of a roller 126. Housings 138 are elongated in this manner so that the bearings for shaft 134 are spaced apart a sufficient distance to insure rigidity of that shaft and to prevent wobbling movement of roller 126 in response to radial thrust. Only one bearing for shaft 134 can be seen in Figure 1, this being designated by the numeral 139. Note that the elongated housing structure is likewise carried out in lower roller 126. The remaining portions of housings 132 and 138 will be hereinafter more fully described in conjunction with the detailed construction of rollers 126 and 127.

It is contemplated that housing 138 be mounted for pivotal movement on tubular support 800, the construction of which is conveniently identical to the construction of tubular support 63 associated with housings 58. It is understood that the angular disposition of shaft 134 may be varied by the employment of a construction such as that used in changing the angular position of shaft 55. The apparatus employed is identical to that used in conjunction with roller 45. In the structure associated with roller 45 (Fig. 1) a shaft 64 is provided with threads over which rides a nut which is pivotally supported between the depending arms of a bifurcated member 66 in turn attached to the bottom of and extending downwardly from housing 58. The free end of shaft 64 is located adjacent a removable dust cap 67 and is adapted for engagement by a socket wrench operated from the front of the machine. When shaft 64 is rotated, bifurcated member 66 is moved through agency of the nut, either closer to or further away from pivoted end bearing 65 of shaft 64, depending on the direction of rotation. Movement of bifurcated member 67 toward end bearing 65 lowers the unsupported end of roller 45 while movement in the other direction has the reverse effect. Housing 58 is of course pivoted about tubular support 63 to permit changing the angular position of shaft 55 and the roller 45 concentrically mounted thereon. Since screw means are used for altering the position of shaft 55, the arrangement is self-locking. Note threaded shaft 140 which corresponds to similar shaft 64 and dust cap 141 through removal of which access to shaft 140 may be gained in order to adjust the angular disposition of roller 126. Housing 132, which corresponds to housing 51 on the other side of the machine, is mounted on a portion of the main frame in such a way that shaft 128 extends in a truly horizontal position. It will be recalled that the angular position of shaft 47 is not adjustable. This is also true of shaft 128.

It is, of course, necessary that each upper roller 126 and its corresponding lower roller 127 be driven at the same peripheral speed. It is likewise desirable that the take-up speed of unit 12 be approximately the same as the delivery speed of unit 11. Upon reference to Figure 4, the manner of accomplishing this may be ascertained. In that figure, it can be noted that main drive shafts 130 and 137 are provided with gears 142 and 143 respectively. These gears are driven by gear 144 on a shaft 145, the opposite end of which carries a gear 146 in mesh with a gear 147 which rests against and meshes with driving gear 75. The latter, it will be recalled, serves also to actuate shafts 50 and 59 to drive the component rollers of unit 11. By substitution of gears of various diameters in the gear train 144, 146, 147, it is possible to bring about any desired speed on the part of rollers 126 and 127 with respect to rollers 45 and 46. Since, however, all rollers 126 and 127 are driven from the same gear, 144, it is apparent that they will have identical peripheral speeds. Like the rollers 45 and 46, the rollers 126 and 127 are provided with liquid supply pipes 269 and 271, and with liquid collecting troughs 274 and 277 respectively.

Figure 7:
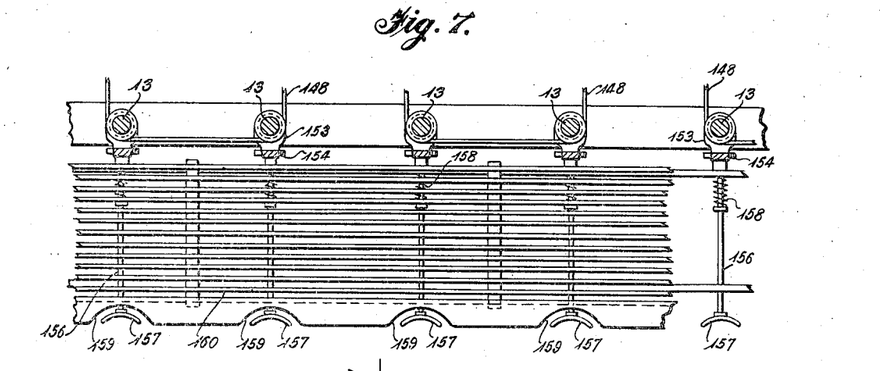
Figure 7 is a fragmentary plan view of the operating deck with which the left side of the spinning machine of Figure 1 is provided.

As has been previously stated, thread-storage, thread-advancing unit 12 is threaded up in the same manner as the respective unit 11. On thread-storage, thread-advancing unit 12, the thread is subjected to further aftertreatments, and, when it leaves that unit, is in finished form. It is then led directly to a ring twister mechanism, best shown in Figures 1, 3 and 8 to 11, inclusive. The twister mechanism shown is largely conventional, being somewhat modified, however to fit under unit 12 in the interest of space conservation. Twister spindles 13 are driven in pairs from belts 148 which pass over and are propelled by a cylindrical pulley 149 keyed to a power shaft 150 driven in any convenient manner, not shown. The usual idler pulleys 151 are associated with belt 148 and a counter-weighted belt tightener pulley 152 is employed. Each twister spindle 13 is provided with the usual brake 153 for localized stoppage of the spindle for the exchange of spools. The brake, itself, is conventional in form but is provided with novel engaging means consisting of a depending arm 154 cooperating with an upwardly extending arm 155 provided with a bifurcated end. Arm 155 is driven through a rod 156 provided with a curved operating surface 157 adapted to be engaged by the leg of the operator as he stands beside the machine. A spring 158 normally biases rod 156 and hence arm 155 to release position. Thus, depending arm 154 is normally biased in a clockwise direction as viewed in Figure 1 thereby urging brake 153 away from the bottom of the spindle, arms 154 and brake arm 153 functioning mechanically as a bell crank. Upon reference to Figure 7, it will be noted that operating surface 157 is disposed in registry with notched-out portions 159 of a grill work 160 serving as a platform on which the operator may stand while threading unit 12. Grill work 160 is supported by braces 161 extending from the main frame of the machine. As can be seen in Figure 1, braces 161 constitute guide bearings for rod 156. The operator, on the other hand, stands on the ground floor of the operating room when twister spindle 13 is threaded up, and, as a consequence, the twister brake operating surface is located for manipulation from that level.

It is contemplated that the thread issuing from unit 12 will be delivered at a rate approximating 60 to 100 meters a minute. Ring twisters, on the other hand, are normally used with thread being pulled from a stationary package. As a consequence, it is impossible for an operator to thread up the traveler of a ring twister with a thread moving at a speed such as is here contemplated, the slack produced being so great as to cause substantial difficulty. For this reason, a novel device and method for threading up the ring twister has been provided. This device consists of a temporary collecting drum 162, driven through a very sensitive clutch, hereinafter more fully described, by an electric motor 163. The housings of electric motor 163 and drum 162 are fastened together to form a unitary structure and that structure is provided with arms 164, 165 and 166 (Figs. 3 and 8) on the respective ends of which wheels are provided. These wheels are arranged to ride in tracks 167 and 168 affixed to the moving traverse ring board, which, during twisting, is reciprocated in a vertical direction in a conventional manner. Tracks 167 and 168, in addition to supporting motor-drum assembly 162—163 for movement therealong, act as conductors for the supply of electric current to motor 163. It is contemplated that motor 163 be a low voltage unit and that one of the poles be served through the machine while the other pole is isolated from the machine by the use of insulating material in the mounting of one of the rails 167, 168.

Figure 8:
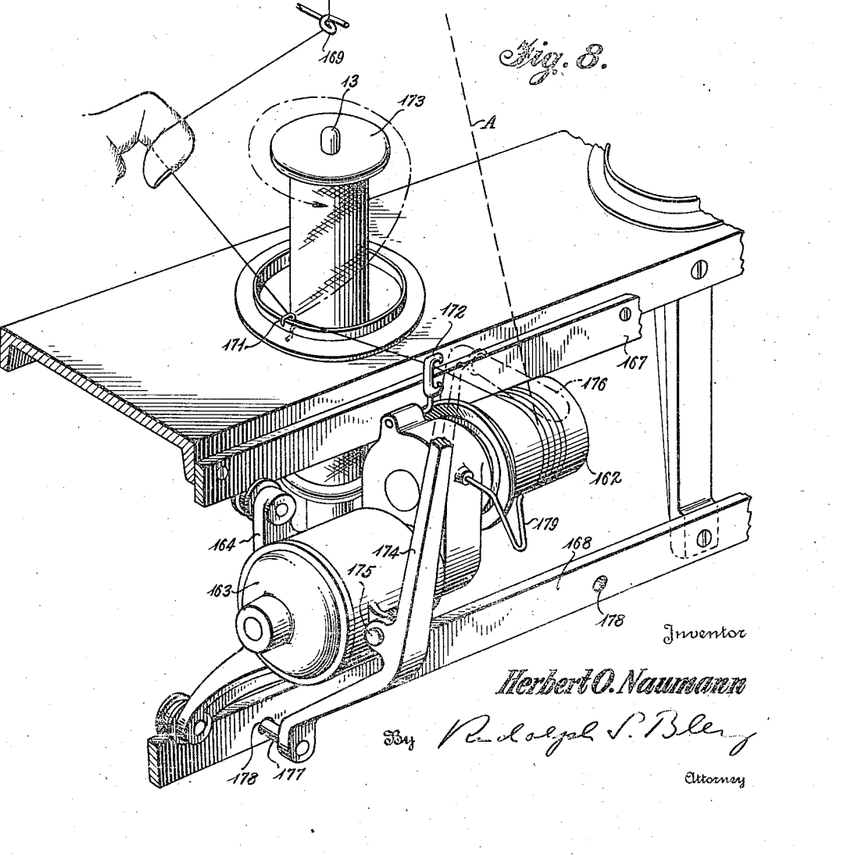
Figure 8 is a perspective view of the ring twister threading apparatus used in conjunction with the present invention.

Referring now to Figure 8, it will be seen that a thread guide 169 supported by a rod 170 is located vertically above and in alignment with twister spindle 13. When the twister traveler 171 is to be threaded, the operator leads the free end of thread issuing from roller 126 of thread-storage, thread-advancing unit 12 and wraps it around a cylindrical spool fittted over drum 162 which has been caused to rotate by energizing motor 163. The driving arrangement between motor 163 and drum 162 is such that the takeup speed of drum 162 will be in excess of the delivery speed from thread-storage, thread-advancing unit 12, a drum takeup speed of approximately five meters a minute in excess of the delivery speed from unit 12 being contemplated. Thus, the thread will be under very slight tension at this stage and will follow the path designated by the reference letter A in Figure 8. The operator then pulls the thread A to the left, as viewed in Figure 8, and threads it through a guide 172 mounted on the motor-drum assembly and through guide 169 above the twister spindle. The thread is then passed under traveler 171. Once this is done, the thread is broken between twister traveler 171 and the drum, the free end being thrown into the rapidly rotating twister bobbin 173 mounted on spindle 13 shown in Figure 8. The relatively small amount of thread collected on the bobbin of drum 162 may be removed therefrom and discarded as waste. In order that the motor-drum unit 162—163 can be moved from spindle to spindle as the respective twisters associated with each unit 12 are threaded up, the wheel-rail assembly is provided. As a consequence, when one twister spindle has been served, the motor car is moved to the next adjacent one. At each unit, however, the motor is locked in operative position. This is done by means of a lever 174 pivoted at 175 to the motor housing. Lever 174 is provided with an operating handle 176 and a pin 177, adapted for cooperation with holes 178 provided at spaced points along lower track 168. When pin 177 is received in a hole 178, the motor and drum unit is restrained against movement along the tracks. When it is to be moved, however, the handle 176 is pushed in toward the twister spindle thereby extracting pin 177 from hole 178 and allowing the device to be manually moved along the track to the next stage.

In order that drum-motor assembly 162 and 163 need not be spotted at the various stations, pivot 175 includes a coil spring which normally urges pin 177 against rail 168. In this way, the operator may push handle 176 in toward the machine to extract pin 177, then release handle 176 and push the car along the track. When the next station is reached, pin 177 will be urged automatically into the next hole 178.

In Figures 3 and 8, a wire guide 179 can be seen extending from a portion of the motor housing. This guide is to insure that the thread is wound on drum 162 and cannot be accidentally wedged in between the drum and the motor assembly to be engaged by moving parts.

Attention is directed to the fact that the various spindles 13 are not located directly under the corresponding thread-storage, thread-advancing unit 12, see Figure 3. The reason for locating the twister spindles between adjacent units is a dual one. In the first place, more space is allowed for guides 169, and, secondly, and of even greater importance, a relatively long path is provided between upper roller 126 and the twister spindle. Since the last stage of aftertreatment normally consists of drying the thread, by the application of heat, thereto, and since, according to this apparatus drying is to be effected on rollers 126, the relatively long path between the said rollers and the associated spindles 13 allows time for the thread to cool before twisting.

Figure 9:
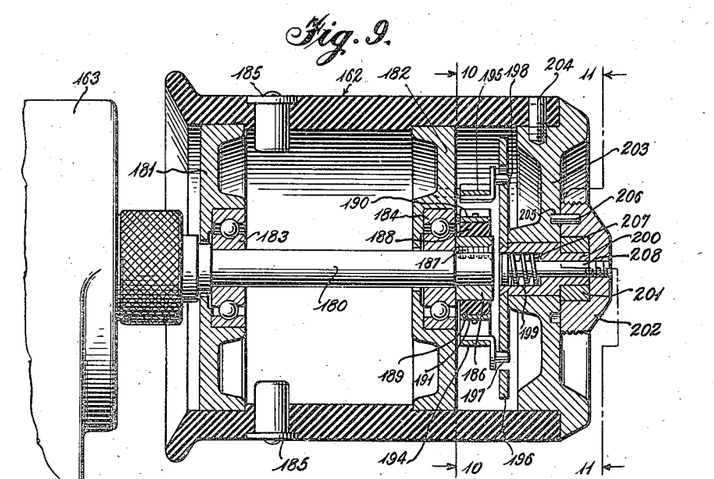
Figure 9 is a view in longitudinal section of a temporary thread collecting device used in conjunction with the threading up of the ring twister shown in Figure 8.
Figure 10:
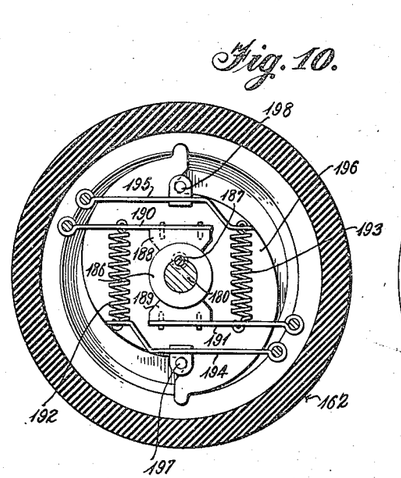
Figure 10 is a view in section taken along the line 10—10 of Figure 9.
Figure 11:
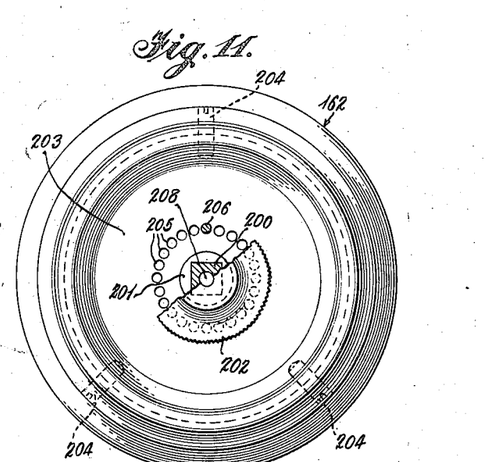
Figure 11 is a view in section taken along the line 11—11 of Figure 9.

In Figures 9, 10, and 11, the internal structure of collecting drum 162 and the driving connection between said drum and motor 163 is illustrated. It can be seen that drum 162 is in the form of a hollow cylinder supported from shaft 180 extending from the housing of motor 163 and connected to the rotor of said motor by suitable reduction gearing, not shown. Flanged spiders 181 and 182 interiorly support drum 162, said spiders being spaced from shaft 180 by ball bearing assemblies 183 and 184. It is contemplated that drum 162 be made of hard rubber and be provided with a plurality of spring latches 185 for the purpose of holding in position a thread collecting bobbin of conventional form, not shown. This is a matter of convenience, since waste yarn wound on the collecting bobbin can be removed from drum 162 by sliding the bobbin axially off the unsupported end of the drum without interference with the driving connections for the latter.

It can be seen that flanged spiders 181 and 182 do not establish a driving connection between shaft 180 and drum 162. On the contrary, these bearings merely serve to support the drum from the shaft in such a way that the two are freely relatively rotatable. At the free end of shaft 180 a small cylindrical collar 186 is keyed in position by a screw key 187. Screw key 187 not only functions to key collar 186 for rotation with shaft 180, but likewise maintains said collar and the shaft against relative axial displacement. Above and below collar 186 arcuate brake shoes 188 and 189 are located. These shoes are disposed on the ends of metallic arms 190 and 191, respectively, the other ends of said arms being pivotally connected to spider 182. From this it can be seen that so long as brake shoes 188 and 189 are urged into engagement with collar 186 a driving connection is established from shaft 180 through the brake shoes and arms 190 and 191 to spider 182 and from thence to cylindrical drum 162.

It has been previously stated that the clutch required in this installation be extremely sensitive in operation. For this reason, means are provided for varying the load on brake shoes 188 and 189. Midway of the lengths of arms 190 and 191, identical coil springs 192 and 193 are attached, these springs being connected to the free ends of arms 194 and 195, respectively, the other ends of said arms being anchored by pins to spider 182, the anchorage being of a nature to permit pivotal movement about the pin. It is now evident that if arm 195 be rocked in a counterclockwise direction, as viewed in Figure 10, and arm 194 be similarly moved, springs 193 and 192 will be extended to thereby increase the pressure on shoes 189 and 188 thereby increasing the frictional contact between said shoes and collar 186 to increase the power resistance differential necessary to cause slippage. The loading and unloading of springs 192 and 193 is accomplished by the employment of a cam 196 having faces of identical curvature disposed 180° apart. The configuration of cam 196 may be readily viewed in Figure 10. Bearing against the surfaces of cam 196 are followers 197 and 198 connected to arms 194 and 195 respectively. Thus, by rotation of cam 196 in a counterclockwise direction, as it is viewed in Figure 10, the distance of followers 197 and 198 from the center of shaft 180 may be increased. Due to the fact that the two cam surfaces of cam 196 are identical in configuration, such movement will bring about an identical increase in loading of both of springs 192 and 193 to thereby increase the clutching effect between shoes 188 and 189 and collar 186. The movement and maintenance of cam 196 in position is effected by apparatus shown in Figures 9 and 11. Cam 196 is connected for rotation with hub 199 provided with a square end 200. Square end 200 is received in a bushing 201 pressed within knurled cap 202. Thus, when cap 202 is turned, the torque is transmitted to cam 196 directly through its hub 199. For maintaining the adjustment, a lock is effected between a flanged spider 203 and cap 202. Flanged spider 203 is marginally connected to drum 162 by three circumferentially spaced screws 204 while its hub portion is mounted for free rotation on the exterior of hub 199 of cam 196. As can be seen in Figure 11, the hub of spider 203 is provided with a plurality of circumferentially spaced sockets 205, each of a size to accommodate a pin 206. Pin 206 is permanently mounted in cap 202 and is adapted to extend into any selected one of the sockets 205. So that a connection may be maintained between cap 202 and spider 203 except during periods of adjustment, the cap is normally biased to the left, as viewed in Figure 8, by a spring 207 mounted within a recess in hub 199. This spring normally urges a pin 208 to the left, as viewed in Figure 9, the shank of said pin being threaded into cap 202.

By the arrangement just described, it is possible to quickly and conveniently vary the loading of springs 192 and 193 to any desired extent within the limits defined by the configuration of cam 196. To do this, the operator grasps cap 202 and pulls it axially away from motor housing 163. This die-engages pin 206 from one of the sockets 205 in spider 203. Thereafter, the cap is turned either to the right or left, depending upon whether the loading of the springs 192 and 193 is to be increased or decreased. Since the springs are shown at the minimum loaded position in Figure 10, it is evident that the cam in that position may be turned only counterclockwise, as viewed in Figure 10. When the desired adjustment is reached, it is only necessary to release cap 202 in any position such that the pin 206 is in registry with one of the sockets to allow spring 207 to draw the cap to locked position.

The effect of the structure just described during the threading up of a ring twister from a unit of a continuous spinning machine is that the peripheral speed of drum 162 may be set to a predetermined value in excess of the delivery speed of thread-storage, thread-advancing unit 12. This excess in speed will be effective, however, only so long as there is no resistance to rotation of drum 162. When thread is wound around the bobbin, which is fitted over drum 162, the tendency of the drum to take up faster than the thread-storage, thread-advancing units delivers tends to load drum 162 so that resistance to turning movement will cause slippage of the clutch construction just described, thereby preventing breakage of thread while at the same time maintaining sufficient tension so that thread will be taut between the free end of the thread-storage, thread-advancing device and drum 162 at all times. Similarly, as the build of thread on the bobbin surrounding drum 162 increases, and so tends to increase the takeup speed of the temporary collecting device, the clutch mechanism will slip to prevent thread breakage while still functioning to maintain the thread taut as shown in Figure 8 while the operator prepares to thread up twister spindle 13. The clutch mechanism just described may be used in temporary collecting devices 77 and 81 to avoid excessive tension of the thread during transfers from the units 11 to the corresponding units 12 in threading up.

Figure 12:
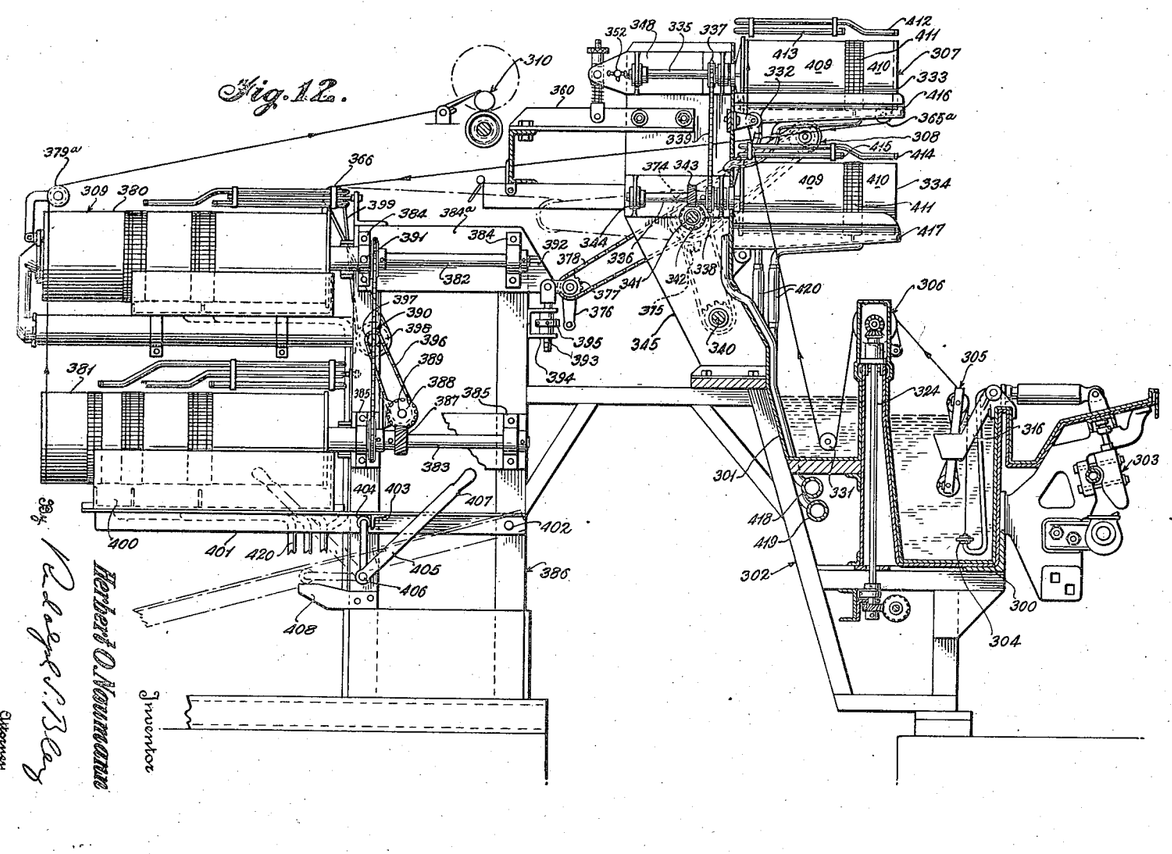
Figure 12 is an end view, partially in section, of a spinning machine constructed according to this invention but somewhat modified for convenient attachment to preexisting spinning equipment.
Figure 13:
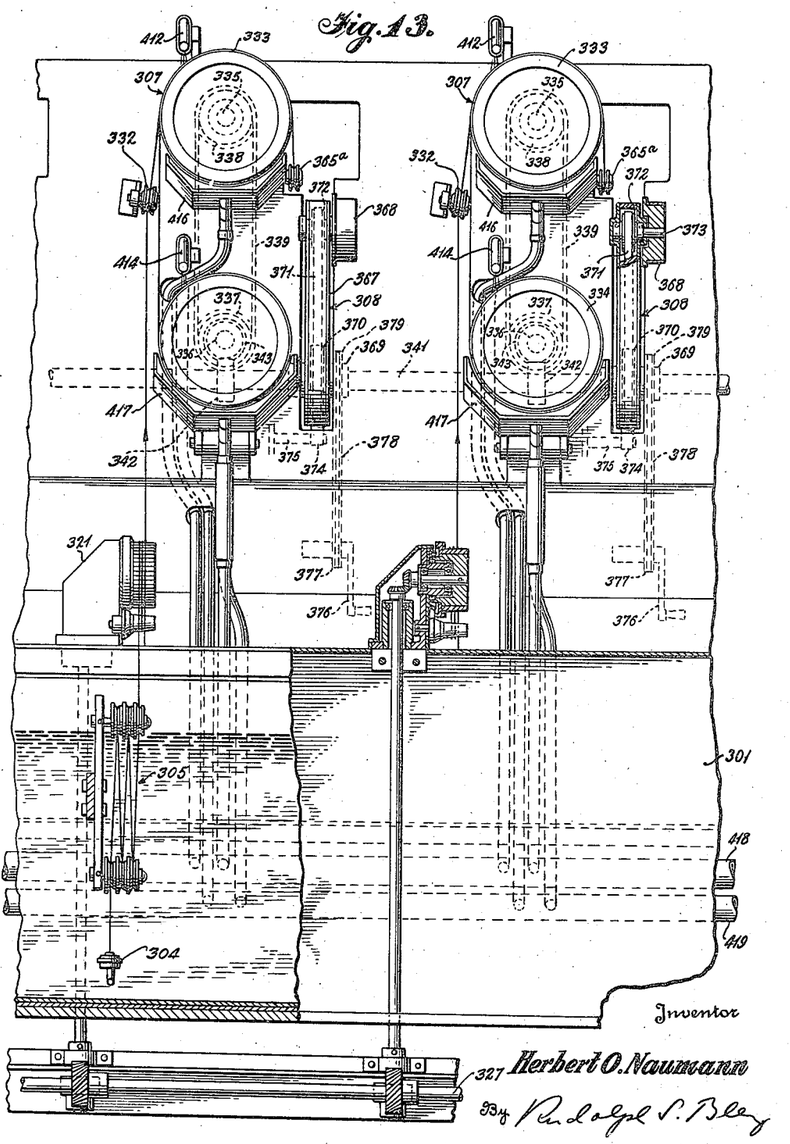
Figure 13 is a view in side elevation illustrating a portion of the right or spinning side of the machine of Figure 12, one godet driving connection being shown in section.

In Figures 12 and 13, there is shown a modified type of continuous spinning machine constructed according to this invention. The liquid treatment steps effected on this machine may be similar to those of the Figure 1 apparatus or may be varied in a manner to be hereinafter described.

As can be seen upon reference to Figure 12, the modified type of spinning machine is assembled in conjunction with a two-bath system in which bath troughs 300 and 301, their supporting framework 302, and spinning pump assembly 303 are adapted from a conventional two-bath spinning layout. Bath troughs 300 and 301 extend continuously for the entire length of the machine, pump units 303 being provided at spaced points along the length of trough 300, each to serve a spinneret 304.

In the modified type of apparatus now under discussion, the thread follows much the same course as in the machine of Figure 1. The thread leaving a spinneret 304 in trough 300 is passed over a long path guiding device 305 and godet 306. From godet 306 it may be led into the bath of trough 301, and from thence to a thread-storage, thread-advancing device indicated generally at 307 or it may be led directly to said device. After device 307 is threaded up, by winding a thread band adjacent the supported end thereof as described in connection with device 11 of Figure 1, the thread is led to a temporary collecting device 308 which is bodily moved to a position adjacent another thread-storage, thread-advancing device designated generally at 309. On this device further treatments are consummated. From there the thread is led to a collecting device indicated generally at 310.

After the thread leaves godet 306, it may be led into a second bath located in trough 301, around an immersed freely rotatable roller 331 and then to thread-storage, thread-advancing unit 307 over guide roller 332. It will be understood that the threading arrangement shown in Figure 12 is merely exemplary showing the mechanical possibilities of the illustrated apparatus. It is evident that long path guiding device 305 may be used either with or without subsequent passage of the thread through bath 301. In the latter case, of course, the thread is led directly from godet 306 to thread-storage, thread-advancing device 307. Similarly, device 305 may be omitted and the thread led directly to godet 306 and from thence either through the bath of trough 301 or directly to thread-storage, thread-advancing device 307 dependent upon the particular chemical treatment undertaken. It will be understood that godet 306 must be driven in timed relation with the spinning pump and hence it is connected with shaft 327 by means of suitable drive mechanism.

Thread-storage, thread-advancing device 307 is similar in structure and operation to the corresponding unit 11 of the continuous spinning machine of Figures 1 and 2. It is threaded up in the same manner and it will cause axial feed of spaced connected coils of thread wound therearound. Unit 307 consists of two rollers 333 and 334 mounted on axially extending shafts 335 and 336 lying in the same vertical plane which are supported at a common end. Each shaft is provided with sprocket 337 over which is trained an endless chain 339 so that both rollers will be driven at the same speed. The power source for driving rollers 333 and 334 through their respective shafts is a shaft 340 caused to rotate by any conventional means not shown. Shaft 340 is connected by a sprocket and chain drive to a shaft 341 which extends for the full length of the machine. At spaced points along the length of shaft 341, gears 342 are located, one being provided for cooperation with a corresponding gear 343 mounted for rotation with shaft 336. Thus, shaft 336 is caused to rotate and through chain 333 drives shaft 335 at an identical speed. Hence the peripheral speeds of rollers 333 and 334 will be identical.

It will be recalled that lower roller 22 of unit 11 is mounted with its axis extending truly horizontally while the axis of upper roller 21 extends generally horizontally but slopes in the direction of the unsupported end of the unit. This arrangement also prevails in conjunction with thread-storage, thread-advancing unit 307. The shaft 336 for lower roller 334 is mounted in anti-friction bearings 344 supported in fixed position from a plate 345 bolted to frame 302. On the other hand, shaft 335 is mounted for movement in a vertical plane so that the angle of convergence of the axes of rollers 333 and 334 may be varied to produce varying coils spacings of thread wound around the two rollers.

Once the adjustment of the angle of shaft 335 has been effected in a manner to cause coil spacing in conformity with the time factor of the treatment effected on thread-storage, thread-advancing unit 307, that unit is threaded up in the manner previously described in conjunction with unit 11, see Figure 1. The thread is passed from roller 331 in bath trough 301 to roller 332 adjacent the supported end of unit 307. From this roller it goes onto the thread-storage, thread-advancing unit and it leaves that unit adjacent a roller 365a. The thread is led around roller 365 and from thence to a roller 366 (Fig. 12) disposed adjacent the supported end of unit 309. As is the case of the apparatus illustrated in Figure 1, the apparatus of Figure 12 comprises two units 307 and 309 which are disposed on opposite sides of the machine. Hence, it is difficult to pass the thread from roller 365a to roller 366 by solely manual means. As a consequence, a rocker arm 367 (Fig. 13) is provided for the purpose of moving a temporary collecting device 368 from a point adjacent the discharge end of unit 307 to a point adjacent the takeup end of unit 309. Arm 367 is mounted for pivotal movement about shaft 341, anti-friction bearings 369 serving to connect the two. Within the housing defining arm 367 a pulley 370 (Fig. 13) is located, connected by a V-belt 371 with another pulley 372. This pulley is keyed to a shaft 373 which likewise carries a temporary collecting device 368. Thus, the rotation of shaft 341 is carried over to temporary collecting device 368. In view of the fact that pulley 370 is somewhat larger than pulley 372, the peripheral speed of collecting device 368 is somewhat increased. The two connecting pulleys are so adjusted that the takeup speed of device 368 is just barely in excess of the delivery speed of rollers 333 and 334 so that the thread will not slack during a threading up operation. Upon reference to Figure 13, it will be seen that a pair of stops 374 depend from the lower edge of arm 367. These members cooperate with a stop 375 attached in any convenient manner to a portion of the machine frame so that arm 367 will, by gravity, always assume the same extreme positions, regardless of whether collecting device 368 is adjacent unit 307 or unit 309.

It can now be seen how temporary collecting device 368 is operated. To move that device from its position adjacent unit 307 to the broken line position shown in Figure 12 adjacent the supported end of unit 309, a crank 376 (Figs. 12 and 13) is operated, this crank causing rotation of a sprocket 377, which, through a chain 378, operates a sprocket 379 keyed to the housing bearings of arm 367. It can be seen that rotation of crank 376 will cause the desired movement to take place, the rocking of arm 367 being entirely independent of pulleys 270, which, of course, is keyed to shaft 341. Once the temporary collecting device 368 has been moved to the broken line position of Figure 12, the thread is broken adjacent that device and is led over roller 366 after which time the coils are wound around the rollers of unit 309 in the manner previously described in conjunction with thread-storage, thread-advancing unit 11. The thread shown leaving unit 309 (Fig. 12) is passed over roller 379a and from thence is led to collecting device 310 of any conventional type, the illustration of Figure 12 being diagrammatic and intended to include a thread supporting body driven at its periphery and used in conjunction with any conventional traverse mechanism; for example, of the type employed in coning machines.

The unit 309·is made up of two rollers 380 and 381, the axes of which lie in the same vertical plane and are convergent in the direction of the unsupported end of the rollers. As before, the axis of roller 381 is truly horizontal, while the axis of roller 380 slopes downwardly from right to left as it is viewed in Figure 12. Rollers 380 and 381 are carried on shafts 382 and 383, respectively, supported in bearings 384 and 385 suitably attached in any convenient way to the left-hand main frame generally designated at 386. Bearings 385 are fixed, and shaft 383 carries a gear 387 which meshes with a gear 388 carried on a main drive shaft 389. Shaft 389 is similar in structure and function to shaft 341, a plurality of gears 388 being provided at spaced points along its length, one for coaction with each gear 387. In this regard, it will be understood that a gear 387 is associated with each unit 309. In a manner similar to the arrangement shown in conjunction with unit 307, roller 380, through its shaft 382, is driven from shaft 383. The drive is a chain and sprocket one indicated generally at 390.

Again in the interest of controlling the space between adjacent coils on the thread-storage, thread-advancing unit, the upper shaft 382 of unit 309 is rendered angularly adjustable. The adjustment is effected by pivotally attaching a plate 384a, which supports bearings 384, at a point 391. Pivoted plate 384a is provided, at a point remote from pivot point 391, with an extending portion 392 onto which a threaded rod 393 is pivotally attached through a bifurcated member. Threaded rod 393 passes through a bifurcated bracket 394 fixedly attached to main frame 386. Within the arms of bracket 394 a hand nut 395 is located. It can be seen that by turning nut 395, the length of threaded rod 393 between that nut and the point of pivotal attachment to projecting portion 392 is varied and that the effect of this variance will be to tilt the plate carrying bearings 384 in which shaft 382 is lodged.

A small sprocket located rearwardly of gear 388 drives a chain 396, which in turn drives a sprocket 397 carried on a stub shaft. The stub shaft also carries a pulley 398 which is connected by a belt 399 to a pulley mounted on a stub shaft with roller 366. Thus, roller 366 is driven through connections so adjusted that it has a takeup speed just a little in excess of the delivery speed from unit 307. This assists in threading up when the closed coil is wound near the unsupported end of unit 309.

Because of the fact that a two-roller thread-storage, thread-advancing device supported at one end only may be threaded up with great convenience, it is contemplated that all forms of the present invention be so arranged.

Figures 14, 16:
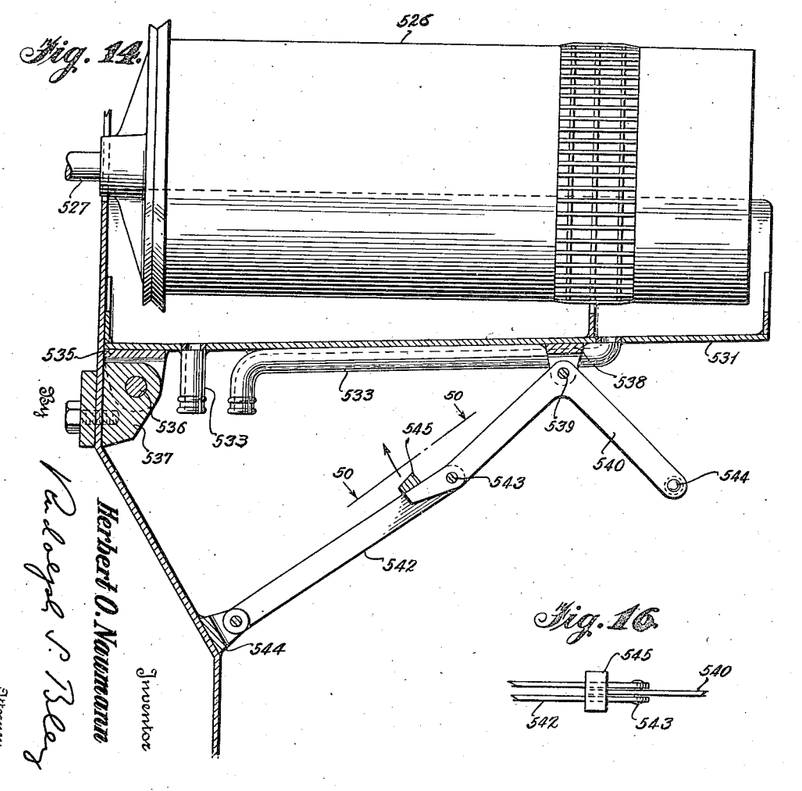
Figure 14 is a view partially in side elevation and partially in longitudinal section of the lower roller of a thread-storage, thread-advancing unit illustrating a movable trough for the collection of used treading liquids.
Figure 16 is a plan view taken along the line 16—16 of Figure 14.
Figure 15:
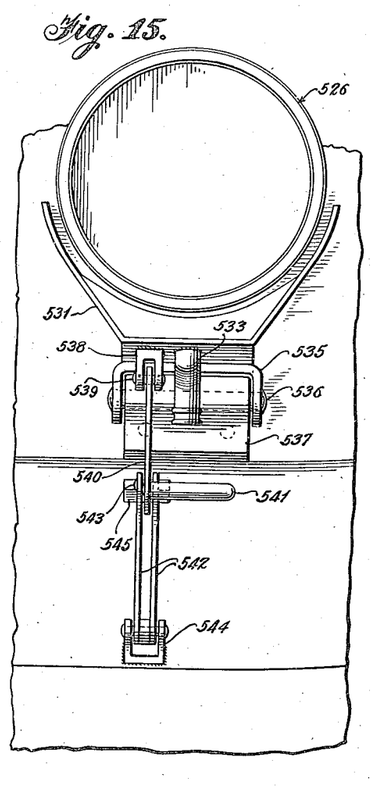
Figure 15 is a view in elevation of the unsupported end of the roller of Figure 14.

In connection with Figure 12, a trough 400 is illustrated, which trough may be moved into and out of collecting position beneath roller 381, the purpose being to facilitate threading up of that roller. A modified form of construction adapted to the same purpose is illustrated in Figures 14 to 16, inclusive. For convenience of illustration, only a single roller is shown and this is of the type used on the right-hand side of the machines of Figures 1 and 12. It is to be understood that this construction may be incorporated in either of these machines. Only the lower roller is shown, it being evident that the troughs associated with the upper roller cannot interfere with threading up since a closed coil need not be wound underneath the upper roller. The single roller illustrated in Figures 14 and 15 is designated by the numeral 526 and is supported and driven by any of the previously described means through a shaft 527. Through supply pipes, not shown in Figures 14 and 15, liquids are sprayed upon roller 526 and are recovered in a trough 531 which may be drained by pipes 533. In threading up, troughs 531 will interfere with the passage of coils around the bottom of roller 526. Thus, trough 531 is provided with a U-bar 535, the transverse portion of which is affixed to the underside thereof at a point adjacent the supported end of roller 526. The shanks of U-bar 535 are provided with registering apertures and a bolt 536 is passed through them and through a bored portion of a frame supported block 537. In this way, trough 531 is pivotally attached to a portion of the main frame of the spinning machine. The under surface of trough 531 has depending therefrom a bifurcated member 538 at a point remote from the point of pivotal attachment of the trough to the main frame of the machine. The arms of bifurcated member 538 are provided with registering apertures which receive a bolt 539 on which a bell crank 540 is pivoted between the two arms. Bell crank 540 is provided with an operating handle 541 (Fig. 15) at the end of one arm and is pivotally connected between two arms 542 by a pin 543 near the end of the other arm. Arms 542 are pivotally connected between the arms of U-member 544 which is affixed to a portion of the main frame. The extreme end of the arm of bell crank 540 which is pivotally attached at 543 to members 542 has extending thereacross a stop plate 545, see Figure 16, of a width sufficient to contact the upper surface of both of the members 542. The effect of this is that the weight of trough 531 tends to rock bell crank 540 in a counter-clockwise direction as it is viewed in Figure 14. Thus, plate 545 is pressed tightly against bars 542. In this connection it is important to note that the left arm of bell crank 540 and bars 542 are not in alignment and that pivot point 543 is below a dead-center position. When the trough is to be lowered, bell crank 540 is rocked about pivot 539 in a clockwise direction making pivot point 543 into an elbow joint so that the front end of the trough may be lowered.

Modification of the process and the apparatus will readily be foreseen by those skilled in the art, and I desire to include all modifications and variations coming within the scope of the appended claims.

This is a division of my application Serial No. 450,934, filed July 14, 1942, entitled "Process and apparatus for the manufacture of synthetic yarn."

I claim:

1. In a continuous spinning machine including at least two thread-storage, thread-advancing devices and a twister device all mutually offset and spaced from each other, temporary collecting means interposed between at least two of said devices and bodily movable into thread receiving position with respect to at least one of them, a power source associated with the temporary collecting means, a yielding driving connection between said power source and said temporary collecting means, and means associated with said yielding driving connection for adjusting the degree of yield thereof to a predetermined value to maintain a constant thread tension during bodily movement of the temporary collecting means.

2. A continuous spinning machine comprising means for forming a thread, a plurality of thread treating stations located at a distance from each other but constituting a unitary machine, each station including a plurality of thread treating devices over which thread passes while being treated, rail means disposed between said stations, thread transfer apparatus adapted to be moved on said rail means between said stations and adapted for passing treated thread issuing from one of said stations to within stringing-up proximity of another of said stations located at a distance therefrom, rotary means carried by said transfer apparatus for temporarily collecting said thread while said apparatus is traveling from one station to another, said rotary means being arranged to rotate at a thread take-up speed which is somewhat greater than the speed of the thread issuing from the treating devices of the station from which the thread is being collected so as to keep said thread under tension while being collected and transferred to within stringing-up proximity of the station located at a distance therefrom.

3. A continuous spinning machine comprising means for forming a thread, a plurality of thread treating stations located at a distance from each other but constituting a unitary machine, each station including a plurality of thread treating devices over which thread passes while being treated, rail means disposed between said stations, transfer apparatus adapted to be moved on said rail means between said stations and adapted for passing treated thread issuing from one of said stations to within stringing-up proximity of another of said stations located at a distance therefrom, rotary means carried by said transfer apparatus for temporarily collecting said thread while said apparatus is traveling from one station to another, said rotary means being arranged to rotate at a thread take-up speed which is somewhat greater than the speed of the thread issuing from the treating devices of the station from which the thread is being collected so as to keep said thread under tension while being collected and transferred to within stringing-up proximity of the station located at a distance therefrom and means for retaining the rotary thread-collecting device in alignment with a station while the thread is being initially collected thereon at said station and in alignment with another station after said rotary collecting device has been brought to within stringing-up proximity of said other station.

HERBERT O. NAUMANN.